United States Patent

Jonas et al.

[15] 3,673,106

[45] June 27, 1972

[54] EMULSIFIER SYSTEM

[72] Inventors: John J. Jonas, Winnetka; Ernest H. Freund, Evanston, both of Ill.

[73] Assignee: Kraftco Corporation, New York, N.Y.

[22] Filed: June 18, 1969

[21] Appl. No.: 834,500

[52] U.S. Cl. .................................252/356, 99/90 R, 99/92, 99/134 A, 99/136, 99/137, 99/139, 252/352, 252/354, 252/363.5, 252/DIG. 1, 424/55, 424/172
[51] Int. Cl. ...........................................................B01f 17/34
[58] Field of Search......................................252/356; 99/139

[56] References Cited

UNITED STATES PATENTS

| | | | |
|---|---|---|---|
| 2,021,027 | 11/1935 | Snell et al. | 252/356 X |
| 2,285,422 | 6/1942 | Epstein et al. | 252/356 X |
| 2,628,930 | 2/1953 | Zentner | 252/356 X |
| 3,034,898 | 5/1962 | Kuhrt et al. | 252/356 X |
| 3,093,488 | 6/1963 | Graham et al. | 99/139 X |

*Primary Examiner*—Richard D. Lovering
*Attorney*—Anderson, Luedeka, Fitch, Even and Tabin

[57] ABSTRACT

An emulsifier system is described for various products and particularly for food products which desirably incorporate air such as foams. The emulsifier system comprises, in combination, fatty monoesters of polyhydric alcohols stabilized in the alpha crystalline form by a crystal transition inhibitor. The monoesters include glycerol monoesters and 1.2 propylene glycol monoesters. The transition inhibitor is a non-surface active salt compound comprising atoms having strong electronegative charge.

15 Claims, No Drawings

EMULSIFIER SYSTEM

This invention relates to emulsifier systems comprising hydroxylated fatty compounds including long chain saturated acyl groups.

Emulsifiers comprising hydroxylated fatty compounds, such as partial fatty acid esters of polyhydric alcohol, e.g. monostearin, or propylene glycol monostearate, have been widely used in the food industry in baked goods, as complexing agents for starch containing products, as additives for ice cream and other frozen desserts and as components for whipped toppings and icings. They have also been used widely in the cosmetic industry as nontoxic, metabolizable emulsifiers in creames, ointments and the like.

The products of the present invention can be used for the same or similar purposes, but have inherent advantages over the known emulsifiers and foaming agents, which are more fully discussed later.

The most important requirements of food emulsifiers are:
1. That they are non-toxic and are readily metabolizable in the human organism.
2. That they are easily water soluble or dispersible and retain this property after prolonged storage at ambient temperatures.

The partial esters of a polyalcohol and higher fatty acids, like mono-stearin or propyleneglycol monostearate, fulfill the first requirement. However, they do not satisfy the second requirement because in the state in which they are usually marketed, they are difficultly soluble or dispersible in water or aqueous liquids at ambient temperatures, and cumbersome procedures are necessary to secure a functional aqueous suspension.

Thus, it would be of great importance to prepare solid emulsifiers, which are water dispersible at ambient temperatures and retain their solubility, dispersibility and functionality even after prolonged storage at elevated temperatures. The emulsifier systems of the present invention which comprise monoesters of higher fatty acids and polyhydric alcohols, are water dispersible and functional even after prolonged storage even at elevated temperatures.

It was found that the functional stability of monoester emulsifiers can be secured by the addition of certain agents, which are transition inhibitors. Their functional role can best be explained by noting the crystal morphology of fatty monoester emulsifiers.

It is generally recognized that fatty monoester emulsifiers can exist in a number of different crystal forms and that their functionality and water dispersibility is dependent upon their crystal form.

The fatty monoester crystals are known to undergo a morphological transition during solidification from a melted state. At first, lower melting crystal species, designated as alpha and sub-alpha, are formed which spontaneously undergo a transition to the thermodynamically stable higher melting beta prime and beta crystal forms.

This transition is recognized as the cause of certain functional deterioration of these emulsifiers during storage.

It is one purpose of this invention to disclose methods by which the thermodynamically unstable, but highly functional alpha crystal species of the fatty monoesters may be substantially permanently preserved.

All of the thermodynamically unstable crystal and semivitreous forms are generally referred to in the following as the "alpha form" and the more stable beta prime and stable beta forms are generally referred to in the following as the "-beta form." The alpha form and beta form of the crystals can be differentiated by X-Ray diffraction and infra-red spectroscopic techniques. By the latter technique, it has been found that the degree of hydrogen bonding within the crystal increases during transition from the alpha to the beta forms. This indicates that the alpha form possesses some rotational freedom, while the beta form is typical of crystal forms without rotational freedom.

The alpha form is generally water dispersible at ambient temperatures and provides whip imparting properties and emulsifying action. The beta form is generally not water dispersible at ambient temperatures and its aqueous suspensions possess low whip imparting properties. The beta form can be reactivated by melting and resolidification, into the alpha form whereby it will be temporarily reactivated. In order to avoid this cumbersome reactivation step, many efforts have been made. Some of these are discussed in the patent literature.

Mixtures of mono and diglycerides have been produced in "self emulsifiable" form by admixing soaps which function as co-emulsifiers. Such mixtures, even if water dispersible, contain glycerides in a beta form, which are deficient in emulsifying power and whip imparting properties, compared with the products of the present invention. Moreover, when used at higher concentrations, the soap imparts an undesirable taste to the mixture which excludes its use in many food products. If distilled monoglycerides and soaps are used, aqueous dispersions containing the monoglycerides in alpha form can be temporarily obtained, however, the transition of the alpha form to the beta form may occur in a few hours, or in several weeks, with loss of functionality.

Another attempt to stabilize monoglycerides in an unstable crystal form is described in Letters Patent of the U.S. Pat. Nos. 3,034,897 and 3,034,898. The preferred composition disclosed in these Letters Patents is a blend of distilled monostearin and distilled propleneglycol monostearate. The blend is rapidly solidified after melting and mixing. It is stated that substantial proportions of the monostearin are in the alpha crystal form for extended periods of time, while the propyleneglycol monostearate of the blend changes from the alpha crystal form to the beta crystal form shortly after solidification. The mixtures described in the above Letters Patents are commercially sold under the name "Myvatex 3–50." However, it has been found that these mixtures exhibit inadequate water dispersibility and which have whip imparting properties even after relatively short storage periods at 37° C. It appears that for incorporation in foods, such as pureed fruits, a preheating of the mixture at temperatures above their melting point is necessary.

A British Pat. No. 1,023,599 issued Mar. 3, 1966, discloses a monoglyceride in a dry form, which is dispersible in cold water, and is prepared by emulsification of the monoglyceride in the presence of edible carriers such as sugar, and subsequently freeze dried. While this procedure provides dispersibility, it does not provide highest whip imparting properties, nor is the monoglyceride retained in the alpha form.

The copending U.S. patent application, Ser. No. 474,199, which has now issued as U.S. Pat. No. 3,453,116, by E. H. Freund and assigned to the assignee of this invention, describes a process by which propyleneglycol monostearate or a mixture of propyleneglycol monostearate and monostearin are stabilized in the alpha crystal form by a stabilizer consisting of an ionic surfactant salt having a high hydrophilic-lipophylic balance (HLB). This emulsifier system retains both high dispersibility, high whip imparting properties, and alpha crystal form after prolonged storage. However, this invention provides certain improvements to be hereinafter described.

The emulsifier system of the present invention consists substantially of a combination of polyhydric alcohol monoester and a particular transition inhibitor. The monoester combination comprises the monoesters of glycerol with saturated, higher fatty acids, and the monoesters of 1, 2, propyleneglycol with higher saturated fatty acids. Effective combinations of the monoesters comprise between about 20 percent and 60 percent of the glycerolmonoester, and between about 40 percent of the glycerolmonoester, and between about 40 percent and 80 percent of the 1, 2, propyleneglycol monoester. Such combinations are referred to in the following as "monoester combination." (All figures expressed herein are percents or parts on a weight basis.)

Moreover, this invention comprises the use of auxiliary components which impart enhanced foam stability and water dispersibility.

The transition inhibitors are generally nonsurface active salts comprising atoms having a strong electronegative charge and capable of forming interfacial complexes with the monoester combination through low energy bonds.

The emulsifier system, comprising the monoester combination and the transition inhibitor, is characterized by a stability of alpha crystal state and exhibits functionality of long duration, even after storage at elevated temperatures.

Moreover, its functionality in terms of whipability surpasses the functionality of monoesters in alpha crystalline state which do not contain transition inhibitors and are thermodynamically in an unstable state. This increased functionality, which is designated as "superfunctionality," is discussed hereinafter.

The auxiliary components are foam stabilizers which are nonionic or ionic surfactants, possessing a high HLB and solubilizers which are highly water soluble compounds.

While the disclosure of copending application, Ser. No. 474,199, which has now issued as U.S. Pat. No. 3,453,116, teach stabilization of crystals in the alpha form in the emulsifier system, some limitations with respect to applications have been encountered. For instance the relatively high concentration of the surfactants needed might cause a problem in food formulations and nonionic surfactants are not functional as transition inhibitors.

The present invention is an improvement upon the disclosure of the copending Ser. No. 474,199, which has now issued as U.S. Pat. No. 3,453,116, and permits the use of certain non-surfactant salts, which are capable of forming hydrogen bonds with the monoester combination and act as transition inhibitors. The transition inhibitors of the present invention are not considered surface active and as such do not substantially lower the surface tension and interfacial tension and belong to a class of compounds designated by McBain et al. (Becher, Emulsions Theory and Practice, second edition, page 24) as Type II. They are distinguished from the surfactants which are surface active, and lower considerably the surface tension and interfacial tension, even when present in low concentrations, e.g., 0.2–0.3 percent. The latter compounds belong to the class designated by McBain et al, Type III compounds.

For an understanding of the action provided by the transition inhibitors, the following hypothesis is advanced which, however, should not limit the present invention. In explaining the function of these inhibitors, it can be said that, during the cooling of a melt of a monoester combination, molecular associations are formed. The driving forces for the formation of these associations are low energy bonding forces. Those which derive from the hydrophobic molecular sites form Van der Wall's bonds. Those deriving from the hydrophylic sites form hydrogen bonds. As long as these molecular associations have rotational freedom, the monoesters are in a semi-vitreous or alpha crystalline state. However, if the action of these bonding forces continues, then the rotational freedom disappears, and transition into the beta crystalline state occurs.

The transition inhibitors are ionic salts capable of interacting with the monoester associations either by Van der Wall's forces and/or hydrogen bonds. Complexes formed by hydrogen bonds can occur in a homogeneous solid phase if the transition inhibitors are soluble in the monoester combination, or in a heterogeneous solid phase, if they are insoluble. The bonded transition inhibitors superpose an electrical charge on these complexes, which causes a repelling force, since the complexes are equally charged. The repulsion counteracts those low energy forces which cause this transition from the alpha to the beta crystalline state.

The repelling effect of the electrical charges of the complexes is evident in the stretching of the long spacings of the monoester combination as observed in the X-Ray diffraction. It is believed that the stretched complexes possess a higher degree of rotational freedom, if they are in the alpha form, and that this provides the superfunctionality as measured by the whipping test.

The 1,2 propyleneglycol monoester alone cannot be stabilized with the transition inhibitors of the present invention. It possesses only a secondary hydroxylic group which is a weak proton donor. Moreover, most of the transition inhibitors are only slightly, or not soluble in the 1,2 propylene glycol monoester, thus they cannot associate by Van der Wall's forces deriving from the lipophylic groups.

The other monoester in the combination cannot be stabilized along because it is a di-hydric alcohol, having at least one primary hydroxylic group. For example, glycerol monostearin is simultaneously a strong proton donor and proton acceptor and, as such, is capable of forming inter and intra molecular hydrogen bonds, leading to three dimensional water insoluble structures. The bonding forces are so strong that they cannot be equalized by the repulsive forces imposed by the inhibitor.

Mixtures of 1, 2 propyleneglycol monoester and glycerol monostearin, within the functional range defined in this patent, are strong enough proton donors to form hydrogen bonds with the non-surfactant inhibitors in homogenous or heterogeneous solid phase. They impose sufficient repulsive force on the complexes to prevent transition from the alpha to the beta form. However, if the proportion of the glycerol-monostearin in the monoester combination is higher than the given functional range, then a slow transition occurs, and only a temporary stabilization will take place. As the proportion of glycerol monostearin is increased in the monoester combination, the transition from the alpha form into the beta form occurs faster.

The level of transition inhibitor in a monoester combination must be sufficient to provide enough electrical repulsion to counteract the forces causing transition. Thus, the higher the level of glycerol monostearin in the monoester combination, the higher will be the required functional level of transition inhibitor. This can be illustrated by reference to Table V. In test 149A having a monoester combination containing 35 parts glycerolmonostearate (GMS) and 65 parts 1, 2 propyleneglycol monostearate (PGMS), an addition of 1 percent sodium propionate is sufficient to prevent transition. In test 111G having a monoester combination of 40 parts GMS and 60 parts PGMS, an addition of 3 parts sodium propionate is necessary to retain the alpha crystalline form.

If the principal components of this emulsifier system are mutually soluble, then they can be combined by co-melting. The cooled melt can be comminuted by milling, or other suitable means, to a fine powder. If, however, they are not mutually soluble or only partly soluble, it is advantageous to use an auxiliary solvent which can later be removed. Thus, 65 parts propyleneglycol monostearate (PGMS) and 35 parts glycerol monostearate (GMS) and 2 parts Tween 60 are melted together at 70° C. An aqueous solution of 5 parts sodium propionate dissolved in 10 parts water (the auxiliary solvent) is then added and the mixture is stirred at 70° C. until it is homogeneous. The water is then removed by vacuum distillation. The water-free mixture is then rapidly cooled and solidified such as by spray chilling, pouring on cold rolls, or supercooling in a heat exchanger and setting. The resulting solid product may be comminuted to a fine mesh size.

In an alternate process, 65 parts of PGMS, 35 parts of GMS, 5 parts sodium propionate and 2 parts of Tween 60 are dispersed in 300 parts of water. The temperature is maintained at or above the melting point of the monoesters, and the mixture is homogenized in a blender, or other suitable equipment. This aqueous dispersion of the emulsifier system has a high functionality and can be stored for extended periods of time at elevated temperatures, e.g., 37° C. The aqueous dispersion can also be dried. Suitable drying methods may be used such as spray drying, foam drying, freeze drying, or mat drying.

The functionality of emulsifier systems can be determined by a whipability test. A test was established which yields reproducible values. In performing this test, a four gram sample of the emulsifier system is dispersed at 21° C. in 200 ml. tap water and the dispersion is whipped in a 5-quart bowl on a Hobart N-50 mixer until the foam reaches its maximum volume. The overrun (weight per volume of the foam), and whipping time are noted. The foam may be subjected to foam stiffness and drainage tests. If solubilizers are present in the emulsifier mixture, a proportionately larger amount of this emulsifier system is used. Emulsifier systems of this invention yield overrun values of up to 2,000 percent within 1–2 minutes. Overruns of 1,300 percent are considered satisfactory. The emulsifier system is considered unsatisfactory if during three months storage at 37° C. a reduction in overrun in excess of 30 percent is sustained, or if the whipping time must be extended more than three times of that before storage.

The functionality of this emulsifier system, which may or may not contain the auxiliary components, is much higher than that of the monoester combination alone, even when converted temporarily to the alpha crystalline form by remelting and rapid cooling. This superfunctionality is established by the whipping test, and is one of the valuable properties of the emulsifier system disclosed herein.

The superfunctionality may be illustrated as follows:

A. A mixture of 65 parts distilled propyleneglycol monostearate, 35 parts distilled glycerol monostearate and 3 parts of sodium propionate was mixed with 300 parts of water and emulsified at 75° C. The emulsion was rapidly cooled and freeze dried. The freeze dried material had an alpha crystal form and the whipping test showed an overrun of 1,780 percent, which was reached after 2 minutes whipping time.

B. In the absence of sodium propionate, an emulsifier combination was prepared identical to that prepared under A was tested immediately after drying. Although an alpha crystal form was evident by X-ray analysis, the whipping test showed an overrun of only 400 percent after a whipping time of 6 minutes.

The commercially available monoester obtained by the esterification of 1, 2 propyleneglycol with stearic acid is a mixture of two isomers, the monoester having a secondary OH group being predominant. The propyleneglycol monoester possessing a secondary OH group is the preferred one for the purposes of the invention. Stearic acid is the preferred fatty acid moiety of the ester, but other fatty acid moieties deriving from oils and fats, which after hydrogenation possess a high content of stearic acid, are also useful. Unsaturated fatty acid moieties are nonfunctional. Examples of fats and oils from which the stearic acid moiety can be derived are soy bean oil, cottonseed oil, lard and tallow. Hydrogenation of the fatty acid moieties can be performed before or after formation of the propyleneglycol monoester. Their principal fatty moiety after hydrogenation is stearic acid. Thus, one of the main components of the emulsifier system is 1, 2-propyleneglycol-1-monostearate (PGMS).

It is important that the PGMS have a high monoester content, since the presence of propyleneglycol diester accelerates the transition from the alpha to the beta crystalline state. Thus, PGMS which has been purified by molecular distillation is the preferred compound.

The monoglycerides present in the monoester combination should be of high purity and may be advantageously purified by molecular distillation. Stearic acid is the preferred fatty acid moiety of the monoglyceride. However, other fat sources which are high in stearic acid content, and are the same or similar to those used in the preparation of the propyleneglycol monoester are also functional. The esters should contain substantially saturated higher fatty acid groups.

The transition inhibitors used for the stabilization of the alpha form in the monoester combinations consists of salts, which contain strongly electronegative atoms such as O, N or F and are capable of forming hydrogenbonds with the hydroxylic groups of the monoester combination. Hydrogen bonds are formed if a proton donor is associated with a proton acceptor. In the present case the proton donor is the monoester combination and the proton acceptor is the transition inhibitor. Hydrogen bonds can be formed intramolecularly and intermolecularly. If intermolecular hydrogen bonds are formed between the same species of molecules they are designated as homo-molecular hydrogen bonds, and if they are formed between different species of molecules they are designated as hetero-molecular hydrogen bonds. Heteromolecular hydrogen bonds exist in a homogeneous solid as well as in a heterogeneous solid phase. The salts should possess a strong cation, preferentially K or Na, however, Mg or Ca or organic cations like tetramethylammonium are also useful. Examples of salts of organic acids which are capable of forming hydrogen bonds are: K-acetate, Na-propionate, Na-levulinate, Di potassium-orthophthalate, etc. Examples of inorganic salts which are capable of forming hydrogen bonds are: secondary and tertiary orthophosphate alkali salts, sodium nitrite and sodium fluoride.. Examples of some of the functional emulsifier combinations are given in Table I.

EMULSIFIER SYSTEMS CONTAINING VARIOUS TRANSITION INHIBITORS & THEIR FUNCTIONALITY

The functionality was measured by whipping tests, before and after storage at 37° C. for 10 weeks. The monoester combination used consisted of 60 parts of PGMS and 40 parts GMS.

TABLE I

| Test No. | Percent | Transition inhibitor | Before storage | | After storage | |
|---|---|---|---|---|---|---|
| | | | Overrun, percent | Whipping time, mins. | Overrun, percent | Whipping time, mins. |
| 41A | 10 | "Kelmar" potassium alginate [1] | 1,670 | 2.0 | 1,640 | 2.5 |
| 65A | 11 | Na salt of carboxymethylcellulose 7AP [2] | 2,000 | 2.0 | 1,640 | 2.5 |
| 114B | 5 | Potassium acetate | 1,780 | 1.25 | 1,710 | 1.5 |
| 146C | 5 | Sodium propionate | 1,740 | 1.25 | 1,610 | 1.75 |
| 116C | 5 | Sodium crotonate | 1,970 | 1.5 | 1,780 | 1.5 |
| 116E | 5 | Sodium maleate | 1,780 | 1.5 | 1,740 | 1.5 |
| 113F | 5 | Sodium oxalacetate | 1,780 | 1.3 | 1,610 | 3.0 |
| 106G | 5 | Sodium glyoxylate | 1,740 | 1.0 | 1,670 | 1.5 |
| 112B | 5 | Sodium hexametaphosphate | 1,820 | 1.2 | 1,670 | 7.0 |
| 121F | 5 | Sodium nitrite | 1,780 | 1.25 | 1,860 | 1.5 |

[1] Kelco Co.  [2] Hercules Co.

Transition inhibitors of low molecular weight possess a small but distinct solubility in the monoester combination, especially at elevated temperatures. This solubility is dependent upon the composition of the monoester combination and the concentration of the inhibitor.

The results tabulated in Table II were obtained by emulsifying an aqueous solution of sodium propionate with the monoester combination at 70° C., cooling and freeze drying the emulsion. The dry mass was remelted at 75° C. and separated from the undissolved sodium propionate by filtration. The clear filtrate was then analyzed for sodium propionate.

TABLE II

Solubility of Sodium Propionate in the Monoester Combination

| Composition of Monoester Combination %PGMS | %GMS | Concentration of Sodium Propionate before filtration % | after filtration % |
|---|---|---|---|
| 238B | 60 | 40 | 2 | 1.59 |
| 238C | 60 | 40 | 3 | 2.10 |
| 238C | 60 | 40 | 4 | 2.25 |
| 239B | 50 | 50 | 2 | 1.70 |
| 239C | 50 | 50 | 3 | 2.97 |
| 239D | 50 | 50 | 4 | 3.64 |

From these data it can be seen that the monoester combination containing more GMS (239 B,C,D) is a better solvent for sodium propionate than the one containing less GMS (238 B,C,D).

Polymeric salts or products which are water soluble and capable of forming hydrogen bonds with the monoester combination can also be used as transition inhibitors. Examples are: sodium alginate, carboxymethyl-cellulose sodium salt, sodium caseinate, pectin salts, carrageenan, agar-agar, etc. Salts which have some surface active properties can also be used as transition inhibitors, but their HLB will be below 16. Since the number of salts which form hydrogen bonds with the monoester combination is a very large one, it is not possible to enumerate all such compounds, but they will be known to those skilled in the art from the foregoing disclosure.

Certain salts, although able to form hydrogen bonds, are less effective or non-functional as transition inhibitors. These contain proton donors in addition to their proton accepting groups, e.g., the salts of amino acids, hydroxy acids like glycolic acid, etc. The probable cause is that homo-molecular hydrogen bonding takes place and thus lowers the number of proton acceptors available for hetero-molecular hydrogen bonding with the monoester combination. Test results of several such salts are given below.

The monoester combination used consisted of 60 parts PGMS and 40 parts GMS. The transition inhibitor content was in each case 5 percent. Functionality was measured by the whipping test, before and after 10 weeks storage at a temperature of 37° C.

TABLE III

| Test No. | Transition Inhibitor | Before Storage overrun whipping % time | After Storage overrun whipping % time |
|---|---|---|---|
| 104A | Sodium glycolate | 420 10' | 0 10' |
| 107B | Sodium beta-hydroxy butyrate | 1710 6.75' | 1010 7' |
| 109C | Sodium glycinate | 970 10' | 550 10' |
| 109D | Sodium alaninate | 1155 10' | 590 10' |

As mentioned before, the functionality can also be determined by physical measurements, such as X-ray diffraction analysis. Distinct differences between the alpha form and beta form can be detected by these techniques.

In X-ray analyses, one distinguishes between short and long spacings. For a polymorphic single component or combinations of such components, the short spacings are in general characteristic of the various crystalline states, while the long spacings are in general characteristic of the chemical structure and composition.

If a functional emulsifier system is permanently stabilized, the short X-ray spacings show an alpha form only. If the emulsifier system is only temporarily stabilized. then the short spacings may indicate the presence of alpha and beta crystalline structures. Emulsifier systems which possess only beta crystalline structure are not functional.

Freshly prepared emulsifier systems may for a short time after their preparation exist in a dynamic transient state during which the short and long spacings change. Thus, useful measurements are best obtained after the system becomes static, which in most cases, will occur within 8 days at 37° C.

In Table IV, the composition of the emulsifier system, the functionality expressed by the whipping data, and the crystal form given in the X-ray data are tabulated. Whipping data and X-ray data were obtained after the samples were subjected to a prolonged storage at 37° C.

It was found that neither PGMS (99A) nor GMS (99H) alone can be stabilized by the transition inhibitors of the present invention. Only certain compositions of the monoester combination can be protected against transition from the alpha form to the beta form. It has also been shown that there is an optimum range of ratios of PGMS:GMS within which storage, for over 4 months at 37° C., did not cause transition. This optimum range consists of from about 60–75% PGMS and from about 25–40% GMS. Within this optimum range, the transition inhibition is substantially permanent, see Examples 146 A–G. If this ratio is changed, then only a temporary transition inhibition is obtained, see Examples 99 D–F, and Examples 146H.

Such a temporary transition inhibition can preserve the alpha crystalline structure for several months even at elevated temperatures, its length being dependent upon the above mentioned conditions. For many industrial purposes only a temporary transition inhibition is necessary, while for other purposes, e.g., manufacture of shelf items like cake mixes, a permanent transition inhibition is the preferred form.

Examples 147 A–D show that sodium acetate is as functional a transition inhibitor as sodium propionate.

In Table V two different compositions of monoester combinations with varying amounts of transition inhibitor (sodium propionate) are compared.

In Series 149 A–G having a monoester combination of 65 parts PGMS and 35 parts GMS, and transition inhibitor concentrations from 1 percent to 7 percent were used. As little as 1 percent inhibitor (149A) was sufficient to prevent transition

TABLE IV

| Sample Number | PGMS, parts | GMS, parts | Inhibitor | Concentration, parts | Storage days at 37° C. | Whipping time, min. | Overrun, percent | Storage days at 37° C. | Whipping time, min. | Overrun, percent | Short spacing assignment | Long spacing, Å. |
|---|---|---|---|---|---|---|---|---|---|---|---|---|
| 99A | 100 | | Na propionate | 5 | 73 | 10 | | 147 | 10 | | Beta | 48.5 |
| 99B | 80 | 20 | do | 5 | 73 | 3 | 1,610 | 147 | 10 | 1,210 | do | 54.4 |
| 99C | 65 | 35 | do | 5 | 73 | 1.5 | 1,780 | 147 | 3 | 1,670 | Alpha | 55.2 |
| 99D | 55 | 45 | do | 5 | 73 | 1.75 | 1,780 | 147 | 10 | 1,160 | Beta | 56.4 |
| 99E | 50 | 50 | do | 5 | 73 | 2.5 | 1,710 | 147 | 10 | 970 | do | 57.0 |
| 99F | 45 | 55 | do | 5 | 73 | 3.5 | 1,640 | 147 | 10 | 920 | do | 57.0 |
| 99G | 40 | 60 | do | 5 | 73 | 6.0 | 1,075 | 147 | 10 | 812 | do | 52.0 |
| 99H | | 100 | do | 5 | 73 | 10 | | 147 | 10 | | do | 49.5 |
| 146A | 60 | 40 | do | 5 | 95 | 1.5 | 1,610 | 122 | 1.75 | 1,780 | Alpha | 56.1 |
| 146B | 62.5 | 37.5 | do | 5 | 95 | 1.5 | 1,740 | 122 | 2.5 | 1,710 | do | 55.5 |
| 146C | 65 | 35 | do | 5 | 95 | 1.5 | 1,710 | 122 | 1.25 | 1,780 | do | 55.4 |
| 146D | 67 | 33 | do | 5 | 95 | 1.25 | 1,710 | 122 | 1.25 | 1,780 | do | 55.7 |
| 146E | 67.5 | 32.5 | do | 5 | 95 | 1.25 | 1,710 | 122 | 1.25 | 1,780 | do | 55.6 |
| 146F | 70 | 30 | do | 5 | 95 | 1.5 | 1,610 | 122 | 1.25 | 1,780 | do | 55.5 |
| 146G | 75 | 25 | do | 5 | 95 | 1.5 | 1,640 | 122 | 1.5 | 1,780 | do | 55.2 |
| 146H | 80 | 20 | do | 5 | 95 | 3 | 1,520 | 122 | 5.0 | 1,415 | do | 54.3 |
| 147A | 62.5 | 37.5 | Na acetate | 5 | 122 | 1.5 | 1,780 | | | | do | 56.5 |
| 147B | 65 | 35 | do | 5 | 122 | 1.5 | 1,740 | | | | do | 56.4 |
| 147C | 66.7 | 33.3 | do | 5 | 122 | 1.25 | 1,740 | | | | do | 56.2 |
| 147D | 67.5 | 32.5 | do | 5 | 122 | 1.5 | 1,780 | | | | do | 55.9 | during a storage of four months at 37° C. In Series 111 having a monoester combination of 60 parts PGMS and 40 parts GMS, a minimum of 3 percent transition inhibitor was necessary to prevent transition during storage at 37° C. (111G).

stabilization of the monoester combination, which stabilization is effected by the transition inhibitor with the monoester combination. The use of a transition inhibitor with the monoester combination, in accord with this invention permits

TABLE V

| Sample number | PGMS, parts | GMS, parts | Inhibitor | Concentration, parts | Storage days at 37° C. | Whipping time, min. | Overrun, percent | Short spacing assignment | Long spacing, A. |
|---|---|---|---|---|---|---|---|---|---|
| 149A | 65 | 35 | Na propionate | 1 | 121 | 2 | 1,780 | Alpha | 55.4 |
| 149B | 65 | 35 | do | 2 | 121 | 1 | 1,820 | do | 56.0 |
| 149C | 65 | 35 | do | 3 | 121 | 1.75 | 1,910 | do | 56.5 |
| 149D | 65 | 35 | do | 4 | 121 | 1.75 | 1,780 | do | 56.0 |
| 149E | 65 | 35 | do | 5 | 121 | 1.25 | 1,710 | do | 55.7 |
| 149F | 65 | 35 | do | 6 | 121 | 1.5 | 1,740 | do | 55.9 |
| 149G | 65 | 35 | do | 7 | 121 | 1.75 | 1,670 | do | 56.7 |
| 111E | 60 | 40 | do | 0 | 69 | 10 | 680 | Beta | 50.0 |
| 111A | 60 | 40 | do | 1 | 69 | 10 | 970 | do | 56.1 |
| 111F | 60 | 40 | do | 2 | 69 | 10 | 1,210 | Alpha & beta | 51.5 |
| 111G | 60 | 40 | do | 3 | 81 | 1.75 | 1,760 | Alpha | 57.0 |
| 111H | 60 | 40 | do | 4 | 81 | 1.75 | 1,780 | do | 58.0 |
| 111I | 60 | 40 | do | 5 | 81 | 1.75 | 1,740 | do | 57.0 |

Table VI describes tests of emulsifier systems containing, as transition inhibitors, salts of hydrocolloids. These compounds have an extremely low solubility in the monoester combination. The results show that such inhibitors are very effective and are also capable of producing superfunctionality. The tests show that the emulsifier systems possess, for the largest part, alpha form. Only after storage of nearly 2 years at 37° C. were small amounts of beta form detected.

the use of only that amount of surfactant which is desired for foam stabilization. The amount would be insufficient to prevent transition of the monoester combination from the alpha form into the beta form in the absence of the transition inhibitors. Either ionic and nonionic surfactants with a high HLB are contemplated since each functions as a foam stabilizer. It is important to note that in accord with the present invention, the inhibition of the transition is accomplished by the

TABLE VI

| Sample number | PGMS, parts | GMS, parts | Transition inhibitor | Concentration, parts | Storage days at 37° C. | Whipping time, min. | Overrun, percent | Short spacings assignment | Long spacings, A. |
|---|---|---|---|---|---|---|---|---|---|
| 37A | 60 | 40 | Sodium alginate | 10 | 660 | | 1,780 | Mostly alpha | 53.3 |
| 65A | 60 | 40 | Carboxymethyl cellulose sodium salt, CMC7AP. | 10 | 130 | 2.5 | 1,640 | Alpha | 52.4 |
| 65A | 60 | 40 | do | 10 | 660 | | 1,440 | Alpha and beta | 52.3 |
| 27A | 60 | 40 | Alkali salts of pectinic acid, LM Pectin 3466. | 10 | 193 | 2 | 1,710 | Alpha | 52.25 |
| 27A | 60 | 40 | do | 10 | 660 | | 1,440 | Alpha and beta | 52.1 |

It was observed that in all tests in which effective transition inhibitors were used, the long spacings were longer than those contributed by the individual monoesters. This indicates the formation of interfacial complexes (compare test 111 E with 111 F-I).

It has also been shown that the stretching of the long spacings increases with increasing concentration of transition inhibitor to a certain extent. (See tests 111 E, A, F and 99 B-F) This increase is related to the solubility of the inhibitor. In tests 149 A-G, where the monoester combination contains less GMS and is therefore a poorer solvent for the inhibitor, the stretching effect is less emphasized. Moreover in the tests of Table VI, where hydrocolloids are used as inhibitor, the stretching effect is still evident although the hydrocolloids have a very low solubility in the monoesters.

The products of the present invention, which are in a static state and possess superfunctionality, can be characterized by the X-ray analysis as possessing alpha form and stretched long spacings. Stretched long spacing alone, if not accompanied by alpha form indicates neither superfunctionality nor even functionality. Alpha form, if not accompanied by stretched long spacings, indicates neither superfunctionality nor stability against transition. Only if both stretched long spacings and alpha form are present, will the emulsifier systems exhibit superfunctionality. Long spacings, as herein defined, means a spacing in excess of 49-50 Angstroms when the monoester combination contains predominantly the stearate moieties.

As has been mentioned earlier the addition of surfactants having a high HLB, to emulsifier system, improves the stability of the foams as measured by stiffness and drainage tests. The use of such ionic surfactants having a high HLB is not for the transition inhibitors which have little or no surface activity and the foam stabilization is effected by small amounts of surfactants with a high HLB in the emulsifier system.

A test was conducted to show the influence of foam stabilizers on the drainage and stiffness of foams. The basic emulsifier system consisted of 60 parts GMS, and 40 parts PGMS and 3 parts sodium propionate. A foam stabilizer, as indicated below, was co-emulsified with the other components at temperatures above their melting points and the suspension was then freeze dried. The stiffness of the foam generated in the whipping test was measured with the Brookfield Viscometer. (Model RVT. on the Heliopath stand; r.p.m. 2.5; spindle 20mm crossbar) The drainage was measured in milliliters by allowing the foam to drain, while standing in a funnel at a temperature of 2° C. for 18 hours.

TABLE VII

| Test No. | Foam Stabilizer | Overrun % | Whipping time-min. | (Scale Reading) Stiffness | Drainage ml. |
|---|---|---|---|---|---|
| 208A | — — | 1780 | 1.25 | 22.0 | 1.3 |
| 209A | 2% sodium salt of succinylated GMS | 1820 | 1.50 | 35.0 | 0.3 |

The high HLB foam stabilizers are only effective at a certain concentration. The feasible concentration ranges and the optimum concentration within these ranges are different for various foam stabilizers, and also dependent on the concentration of the transition inhibitors of the present invention. Such differences are demonstrated and discussed in connection with Table VIII. The incorporation of 1-2 percent of the foam stabilizers into the emulsifier system is in most cases sufficient. The foam stabilizers are also bound by low energy bonds to the monoester combination. A pure physical mixture, prepared by the addition of the foam stabilizers to the stabilized monoester combination in the solid state, is not effective. Examples of suitable nonionic foam stabilizers are Tween 60, Tween 85, Tween 80, Myrj 52 and 53, which are ethylene oxide adducts of, or esters of, higher fatty acids, and Drewpol 3-1SH, which is a polyglycerol ester of a higher fatty acid. Examples of suitable ionic foam stabilizers are sodium oleate, sodium stearate, sodium palmitate, sodium myristate, sodium laurylsulfate, sodium salt of succinylated monoglycerin, and sodium salt of stearyllactic acid.

To determine the functional concentration range of foam stabilizers, an emulsifier system was prepared with 60 parts PGMS, 40 parts GMS and the indicated amount of transition inhibitor, sodium propionate. All components were suspended in 300 parts water at 75° C., homogenized, and freeze dried. Functionality was measured by whipping tests before and after storage for 4 months at 37° C.

and 11 it is shown that functionality of Tween 60 is substantially independent of the sodium propionate concentration. In the runs 12, 13, and 14, the dependence of Tween 80 on the concentration of the sodium propionate is shown. Tween 80 causes loss of functionality if 6 parts of sodium propionate are present. In general, the foam stabilizers are functional at between 1 part and 6 parts in the emulsifier system.

The usefulness of emulsifiers in many applications, e.g., in baking mixes, depends both upon its solubility or dispersibility and the rate of dissolution or dispersion of the emulsifier in an aqueous system. This rate is a direct function of the surface area. Thus, it is advantageous to use the emulsifier in a finely powdered form. However, it was found that the rate of dissolution or dispersion is substantially increased, if to an aqueous dispersion of the emulsifier system, certain highly water soluble substances are added prior to drying. Substances which are very suitable for this purpose are referred to as solubilizers, e. g., lactose, sucrose, skim milk solids, sodium caseinate, gums, sodium salt of carboxymethylcellulose, etc. Solubilizers are usually added in amounts of 5-100 percent of the weight of the emulsifier system. It is advantageous in many cases to select such materials as solubilizers, that are inherent components of the end products, e.g., sucrose or skim milk for baked goods. Preferred are those solubilizers which act also as transition inhibitors, e.g., carboxymethyl cellulose salts or sodium caseinate, and which do not interfere with the foam stabilizers or other transition inhibitors present.

TABLE VIII

| Run number | Test number | Transition inhibitor | Parts | Foam stabilizer | Parts | Before storage | | After storage | |
|---|---|---|---|---|---|---|---|---|---|
| | | | | | | Overrun, percent | Whipping time, mins. | Overrun, percent | Whipping time, mins. |
| 1 | 151A | Sodium propionate | 2 | Sodium salt of succinylated GMS | 2 | 1,960 | 2.0 | 1,780 | 1.5 |
| 2 | 151C | do | 6 | do | 2 | 2,000 | 1.8 | 1,780 | 1.5 |
| 3 | 139F | do | 2 | do | 6 | 1,860 | 2.3 | 1,780 | 2.25 |
| 4 | 153A | do | 2 | Sodium oleate | 2 | 2,000 | 1.75 | 1,780 | 1.5 |
| 5 | 153F | do | 2 | do | 6 | 640 | 10.0 | 0 | 10.0 |
| 6 | 157A | do | 2 | Sodium myristate | 1 | 1,710 | 1.5 | 1,780 | 2.5 |
| 7 | 157B | do | 2 | do | 2 | 1,860 | 2.25 | 1,075 | 10.0 |
| 8 | 133A | do | 0 | do | 5 | 2,000 | 1.25 | 1,680 | 2.75 |
| 9 | 154A | do | 2 | Tween 60 | 2 | 2,000 | 1.66 | 1,780 | 1.75 |
| 10 | 154B | do | 4 | do | 2 | 1,900 | 1.5 | 1,780 | 3.0 |
| 11 | 154C | do | 6 | do | 2 | 1,740 | 1.5 | 2,000 | 1.5 |
| 12 | 154D | do | 2 | Tween 80 | 2 | 1,820 | 1.33 | 1,780 | 1.5 |
| 13 | 154E | do | 4 | do | 2 | 1,940 | 1.5 | 1,780 | 1.5 |
| 14 | 154F | do | 6 | do | 2 | 1,930 | 1.33 | 0 | 10.0 |

In the above tests functional concentration ranges of foam stabilizers, and the mutual influence of the transition inhibitors and foam stabilizers, are demonstrated.

In runs 1, 2, and 3 it is shown that the sodium salt of succinylated GMS, has a wide functional concentration range, which is substantially independent of the concentration of the transition inhibitor. In runs 4 and 5 it is shown that sodium oleate causes a loss of functionality, if used at a concentration of 6 parts in the presence of 2 parts of sodium propionate. In runs 6 and 7, it is shown that sodium myristate causes loss of functionality if used in a concentration of 2 parts in the presence of 2 parts of sodium propionate. Run 8 shows that this loss is caused by the presence of the sodium propionate, since in its absence, the emulsifier system remains functional, even at a level of 5 parts sodium myristate. In the runs 9, 10

It is important that the emulsifier system of the invention be substantially free from solvents which facilitate the recrystallization and transition of the monoester combination. Preferably, the emulsifier system should not comprise any substantial amount of di and triglycerides or propyleneglycol diesters. If this is not feasible, they should be limited to amounts below 10 percent. It has been found that the solvents, including fats and oils, whether saturated or unsaturated, tend to reduce emulsifying and whip imparting properties, and impair the crystal stability. Certain derivatives of glycerol esters, e.g., glycerol lacto stearate or succinylated glycerol monostearate, can be tolerated in high concentration. However, in the course of their applications, the emulsifier systems can be mixed with fats and oils without losing their usefulness. This is possible because in most cases, especially in the preparation of batters

TABLE IX

| Sample number | Concentration of fatty additives in the monoester combination | Before storage | | After storage | |
|---|---|---|---|---|---|
| | | Overrun, percent | Whipping time, min. | Overrun, percent | Whipping time, min. |
| 128A | 10% Lorol (a diglyceride fat) | 1,610 | 10 | 1,000 | 10 |
| 128B | 20% Lorol (a diglyceride fat) | 944 | 10 | 860 | 10 |
| 128C | 30% Lorol (a diglyceride fat) | 770 | 10 | | |
| 124A | 10% light cottonseed oil | 1,640 | 5.25 | 1,370 | 10 |
| 124B | 20% light cottonseed oil | 1,210 | 10 | | |
| 124C | 30% light cottonseed oil | 1,190 | 10 | 1,085 | 10 |
| 124D | 10% hard soyabean stearin | 980 | 10 | 980 | 10 |
| 124E | 20% hard soyabean stearin | 944 | 10 | 970 | 10 |
| 124F | 30% hard soyabean stearin | 930 | 10 | 970 | 10 |
| 130A | 10% propyleneglycol distearate | 1,780 | 2 | 1,305 | 10 |
| 130B | 20% propyleneglycol distearate | 1,190 | 6 | 850 | 10 |
| 130C | 30% propyleneglycol distearate | 840 | 6 | 790 | 10 | for baked goods, the time of transition of the emulsifier system from the functional to the non-functional state is much longer than the time required by the emulsifier system to exert its function during its application. Thus, the emulsifier system must be substantially fat free to maintain its stability during storage. However, its utility is retained on addition to fat containing systems if its effect can be utilized before its stability is lost.

To show the effects of fats and fatty additives on the stability of emulsifier systems, a monoester combination consisting of 60 parts PGMS and 40 parts GMS were mixed with a fatty additive and melted to a homogeneous mixture at 70° C. 100g of this mixture were added to an aqueous solution of 5 parts sodium propionate in 400 parts of water at 70° C. and a homogeneous suspension was made by intensive stirring. The suspension was then freeze dried and stored for 12 weeks at 37° C.

APPLICATIONS FOR THE EMULSIFIER SYSTEMS

Emulsifier systems of the present invention, which are used as examples for various application tests, are tabulated below. The figures in Table X designate parts by weight, unless otherwise indicated.

The emulsifier systems were prepared as before described and in this connection, in the method of preparation (I), one part of the transition inhibitors and, if present, the foam stabilizers, were dissolved in 2-½ parts of water, which was preheated at 75° C. This solution was added to a monoester combination which was melted at 70° C., and the mixture was stirred, while maintaining the temperature until the aqueous solution was homogenously distributed. Then the water was distilled off in vacuum, and the residual mixture was spray-chilled to a fine powder with an average particle size of 50 microns. In method of preparation (II) all ingredients were suspended in three times the amount of water at 75° C. and homogenized. The emulsion was then spray dried or freeze dried.

The superfunctionality of the emulsifier systems of the present invention allows the production of foams with a high overrun. Such foams are valuable for desserts, toppings, icings, frozen desserts and dairy whips and these foams can be stored in frozen condition.

In Table XI, some examples are given for applesauce foams and in Table XII some examples are given for dairy whips.

APPLESAUCE FOAMS

In these tests, the indicated weights of emulsifier was suspended in 40 ml. water at 21° C., then 200 g. of applesauce having a solids content of 25 percent were added. The mixture was whipped in a Hobart mixer N–50 using a 5-quart bowl until the maximum foam height was reached.

DAIRY WHIPS

In these tests, the indicated quantity of emulsifiers was suspended in 40 ml. water, and the suspension was added to 224 ml. of a light cream having 15 percent fat content

TABLE XII

| Emulsifier | Composition of Emulsifier | Crystal form | Emulsifier storage °C—time | whip time min. | over run % |
|---|---|---|---|---|---|
| SD–54 10 g. | 35 parts GMS 65 parts PGMS 3 parts Na-propionate 50 parts skimmilk powder | alpha | 37°C 26 mo. | 9 | 270 |
| SD–68 10 g. | 35 parts GMS 65 parts PGMS 2 Tween 60 2 Na-propionate 50 skimmilk powder | alpha | 37°C 26 mo. | 9 | 390 |
| Myvatex 3–50 5g. | Mixture of distilled GMS and PGMS | beta | 20°C 3 mo. | 9 | 0 |

TABLE X

| Sample number | Monoester combination (parts) PGMS | GMS | Transition inhibitor, (parts) | Foam stabilizer (parts) | Solubilizer (parts) | Method of prep. | Method of drying | Storage (98° F.) days | Whip. time, min. | Overrun, percent |
|---|---|---|---|---|---|---|---|---|---|---|
| 146C | 65 | 35 | (5) Na-propionate | | | I | Spray chilled | 122 | 1.75 | 1,740 |
| 148A | 65 | 35 | (5) Na-acetate | | | I | do | 122 | 4— | 1,820 |
| 154A | 65 | 35 | (2) Na-propionate | (2) Tween 60 | | I | do | 239 | 3 | 1,780 |
| SD–68 | 65 | 35 | do | do | (100) low heat skim-milk powder | II | Spray-dried | 380 | 3 | 1,720 |
| 165A | 60 | 40 | (3) Na-propionate | 2 Na-salt of stearoyl lactic acid | | II | Freeze-dried | 117 | 1.75 | 1,780 |
| 156A | 65 | 35 | (2) Na-propionate | 1 Na-palmitate | | II | do | 119 | 1.75 | 1,950 |
| 220E | 60 | 40 | do | (1.0) Na-stearate (1.5) sodium salt of succinylated monostearin | (30) low heat skim-milk powder | II | do | 61 | 1.25 | 1,820 |
| SD–54 | 60 | 40 | do | | (50) low heat skim-milk powder | II | Spray-dried | 740 | 1.5 | 1,990 |

USE OF THE EMULSIFIER SYSTEMS IN BREAD BAKING

Bread was prepared in a conventional manner using a sponge prepared with 2 percent lard. This was added to a

TABLE XI

| Emulsifier | Composition of emulsifier (parts) | Crystal form | Emulsifier storage, ° C. (time) | Whip. time, min. | Overrun, percent |
|---|---|---|---|---|---|
| Myverol 1800 (4 g.) | Distilled GMS | Beta | 20° (14 mo.) | 10 | 0 |
| Myvatex 3–50 (4 g.) | Mixture of distilled GMS and PGMS | do | 20° (3 mo.) | 10 | 0 |
| Myverol 1800 (4 g.) | Distilled GMS | Alpha | Freshly cooled from melt | 10 | 400 |
| Myvatex 3–50 (4 g.) | Mixture of distilled GMS and PGMS | Alpha-beta | 21 days at 37° C. after cooling from a melt | 10 | 250 |
| Do | do | Alpha | Freshly cooled from a melt | 10 | 450 |
| 146C (4 g.) | (35) GMS (65) PGMS (5) Na-propionate | Alpha | 37° (9 mo.) | 10 | 470 |
| 154A (4 g.) | (35) GMS (65) PGMS (2) Tween 60 (2) Na-propionate | Alpha | 37° (8 mo.) | 10 | 750 |
| SD–68 (8 g.) | (35) GMS (65) PGMS (2) Tween 60 (2) Na-propionate (100) skim milk powder | Alpha | 37° (26 mo.) | 10 | 1,415 |
| 225A (4 g.) | (35) GMS (65) PGMS (4) Na-propionate and Tween 60 | Alpha | 37° (5 mo.) | 10 | 1,130 | dough mix and baked. The softness of the bread was determined 24 and 72 hours after baking, by the method of the American Association of Cereal Chemists entitled "Staleness of Bread — Compression of Firmness Test with Bloom Gel Meter." (Cereal Laboratory Methods, 1959 6th Edition, section 85 1b page 352. Published by American Association of Cereal Chemists, University Farm, St. Paul, Minn.) Lower values indicate softer bread. The results of the baking test with various compounds of this invention are set forth in Table XIII.

Formulas for white, yellow and chocolate cake mixes are given in Table XIV. To these mixtures, emulsifier systems are added as indicated in Tables XV and XVI. Especially suitable for the use in cake mixes are those emulsifier systems which contain foam stabilizers and solubilizers, which components have been discussed above in Table X, sample numbers SD–68, and 220E. If emulsifier systems containing solubilizers are employed, the emulsifier concentration has to be increased in order to compensate for the nonemulsifying solubilizers present.

TABLE XIII

| Emulsifier | Composition (parts) | Crystal form | Storage, °C. (time) | Compressibility after— | |
|---|---|---|---|---|---|
| | | | | 24 hrs. | 72 hrs. |
| None | | | | 156 | 264 |
| Myverol 1800 (0.5%) | Distilled GMS | Beta | 20° (14 mo.) | 116 | 220 |
| Do | Distilled GMS, freshly cooled from a melt | Alpha | | 105 | 180 |
| Myvatex 3-50 (0.5%) | Mixture of distilled GMS and PGMS, freshly prepared from a melt | do | 37° (1 mo.) | 128 | 188 |
| Do | do | Beta | 37° (7 mo.) | 125 | 211 |
| SD–68 (0.5%) calculated on the lipoid content of the composition. | (35) GMS<br>(65) PGMS<br>(2) Na-propionate<br>(2) Tween 60<br>(104) Skim milk powder | Alpha | 27° (26 mo.) | 114 | 198 |

USE OF NEW EMULSIFIER SYSTEMS IN CAKE MIXES AND CAKE BAKING

Commonly used cake mixes usually contain flour, sugar and emulsified fats as ingredients. By means of the new emulsifier systems, however, novel cake mixes can be prepared which do not require the presence of the emulsified fats in the cake mixes.

When cakes are prepared from these cake mixes, only water needs to be added, since such mixtures yield cakes with excellent structural properties without the addition of shortening. However, if it is desired to add shortening, amounts up to 20 percent and more may be added, preferably in the form of oils, and any cooking or salad oil may be used for this purpose. With the use of shortening, the water addition is modified in the manner described in Table XVI.

Cake mixes prepared with the emulsifier systems of this invention have many advantages, including the following:

1. They may contain higher sugar to flour ratio than those in commercially available cake mixes.
2. Cakes may be baked with no shortening at all.
3. When the use of shortenings is desired, cakes may be baked containing a substantially higher shortening to flour ratio than previously possible.
4. Shortenings used in commercial cake mixes contain an average of about 18 to 20 percent emulsifier relative to the fat to facilitate dispersion of the shortening in the batter. This invention reduces the emulsifier requirement to only 6 to 7 percent of the fat in the event when fat is used at a level of 20 percent.
5. In commercially available cake mixes, hydrogenated or semi-solid shortenings must be used, in order to prevent bleeding of the cake mix powder. The emulsifier system of this invention permits the use of liquid oil with its attendant nutritional advantage.
6. The large surface area presented by shortenings incorporated in commercially available cake mixes requires the inclusion of quantities of anti-oxidants to prevent oxidation. Such oxidation problems do not exist in cake mixes which do not contain fat, or in which the oil or fat is added during the preparation of the batter.
7. Fat free cake mixes made possible by this invention are storable at elevated temperatures, while the storage of commercially available cake mixes at such temperatures results in their deterioration.

TABLE XIV

Composition of Cake Mixes (in percents)

| Ingredients | white cake | yellow cake | chocolate cake |
|---|---|---|---|
| Sugar, granulated | 48.37 | 47.00 | 45.18 |
| Flour | 40.36 | 39.09 | 35.86 |
| Cocoa | — | — | 5.63 |
| Dried whole egg | — | 4.87 | 4.81 |
| Dried nonfat milk (low heat) | 2.54* | 2.94* | 3.05* |
| Edible wheat starch | 2.13 | 2.01 | 1.89 |
| Dried Egg White | 1.57 | — | — |
| Dextrose | 1.52 | — | — |
| Salt | 0.73 | 1.22 | 1.11 |
| Skim milk containing 60% lecithin | 1.01 | 0.97 | — |
| Sodium Bicarbonate | 0.68 | 0.71 | 0.96 |
| Sodium-aluminum-Phosphate | 0.71 | 0.79 | 0.38 |
| Monocalcium Phosphate | — | — | 0.06 |
| Vanilla | 0.38 | 0.40 | 0.19 |
| | 100.00 | 100.00 | 100.00 |

*Part of dried nonfat milk is contained as the solubilizer component of the emulsifier system.

In baking cakes from these mixes, a 1-step or a 2-step water addition method can be used. Experience has shown that the one step water addition procedure requires a finer particle size dispersion of the emulsifiers, than the two step water addition. In the following examples a two step water addition procedure has been described.

550 g of cake mix are put into a mixing bowl of a Hobart mixer and the oil or shortening, if such is used, is added. Then the amount of water (80 ml.) used in the first step is added. This mixture is blended at low speed for three minutes and then the water in amount (250 ml.) prescribed for the second step, is added. Mixing is continued for 5 to 6 minutes at medium speed. After mixing, the specific weight of the batter is determined. The batter is then poured into two lined eight inch cake pans each containing 400 grams batter. The pans are baked at 176° C. for 30 to 35 minutes.

The concentration of the emulsifier system in the cake mix depends upon the type of mix. For a white cake mix of the formula in Table XIV, concentrations between 1.000 percent and 1.75 percent of the weight of the cake mix have been found best suited. The influence of the concentration of the emulsifier system on batter aeration and cake volume of white, yellow and chocolate mixes is given in Table XV.

TABLE XV

Cake Baking of Mixes Containing Various Emulsifier Concentrations

| type of cake | concentration of emulsifier SD-68 in cake mix, % | spec. weight of batter | cake volume ml. |
|---|---|---|---|
| white | 0 | 1.05 | 983 |
| White | 0.5 | 0.94 | 1183 |
| white | 0.75 | 0.83 | 1258 |
| white | 1.0 | 0.76 | 1292 |
| white | 1.25 | 0.70 | 1325 |
| white | 1.50 | 0.67 | 1292 |
| white | 1.75 | 0.65 | 1278 |
| yellow | 1.0 | 1.82 | 1292 |
| yellow | 1.25 | 0.78 | 1342 |
| yellow | 1.5 | 0.74 | 1367 |
| chocolate | 1.0 | 0.79 | 1508 |
| chocolate | 1.25 | 0.77 | 1464 |
| chocolate | 1.5 | 0.75 | 1425 |

The cakes were prepared by the two step water addition procedure. The first addition was 80 ml. water, the second addition was 250 ml. Simultaneously with the first water addition, were added 70 g of light salad oil.

The influence of the oil addition on the results of baking white, yellow and chocolate cakes is described in Table XVI. The cakes were prepared by a 2-step water addition procedure, and the oil was added simultaneously with the first water addition.

In these cakes, various amounts of oil were used and the amounts of water added in the first and second mixing step are tabulated. The composition of the ingredients with the exception of oil are those given in Table XIV.

TABLE XVI

Variation of Oil Addition in Cake Baking

In all cases, emulsifier system SD-68 (Table XIII) was used in a concentration of 1.35%.

| Type of cake | (g) amount oil | (cc) 1st step water | (cc) 2nd step water | specific gravity | ml. volume |
|---|---|---|---|---|---|
| white | 27 | 80 | 270 | 0.68 | 1125 |
| white | 54 | 80 | 260 | 0.70 | 1217 |
| white | 70 | 80 | 250 | 0.71 | 1225 |
| white | 81 | 80 | 230 | 0.68 | 1187 |
| white | 110 | 80 | 210 | 0.67 | 1183 |
| yellow | 0 | 100 | 250 | 0.85 | 1175 |
| yellow | 75 | 85 | 230 | 0.78 | 1342 |
| yellow | 100 | 80 | 220 | 0.78 | 1308 |
| chocolate | 0 | 110 | 240 | 0.77 | 1317 |
| chocolate | 75 | 95 | 220 | 0.77 | 1464 |
| chocolate | 100 | 90 | 0.772 | | 1442 |

In the foregoing an improved emulsifier system has been described which is adapted for various products. In this connection, while the products have been disclosed primarily for use in the food field, and particularly for purposes of effecting improved incorporation of air and for providing stable foams, the products of the invention have application for other uses such as in cosmetics and personal sundries such as toothpastes. The non toxic character of the emulsifier system of this invention makes it particularly adaptable to systems used personally by humans.

The various features of the inventions which are believed to be new are set forth in the following claims.

What is claimed is:

1. An emulsifier system comprising a combination of fatty monoesters of polyhydric alcohol stabilized in the alpha crystalline form, said emulsifier system consisting essentially of a transition inhibitor and a mixture of glycerol monoester and 1, 2, propyleneglycol monoester with each monoester having a saturated fatty acid moiety derived from soybean oil, cottonseed oil, lard and/or tallow, the glycerol monoester comprising from about 20 percent to about 60 percent of said mixture and the 1, 2, propyleneglycol monoester comprising from about 40 percent to about 80 percent of said mixture, said transition inhibitor being a nonsurface active salt having a cation selected from alkali metal, alkaline earth metal and tetramethylammonium and an anion having at least one strongly electronegative atom selected from O, N and F, said transition inhibitor being present in an amount of at least 1 percent by weight of said emulsifier system which is sufficient to form an interfacial complex with the mixture of monoesters.

2. An emulsifier system in accord with claim 1 in which the glycerol monoester comprises glycerol monostearate.

3. An emulsifier system in accord with claim 1 in which the glycol monoester comprises propylene glycol monostearate.

4. An emulsifier system in accord with claim 1 in which the monoesters comprise glycerol monostearate and propylene glycol monostearate.

5. An emulsifier system in accord with claim 1 in which the transition inhibitor forms hydrogen bonds with the hydroxylic groups of the monoesters.

6. An emulsifier system in accord with claim 5 in which the salt has a strong cation.

7. An emulsifier system in accord with claim 1 in which the transition inhibitor is sodium propionate.

8. An emulsifier system in accord with claim 1 which further includes a foam stabilizer comprising a surfactant having a high HLB.

9. An emulsifier system in accord with claim 8 wherein the surfactant is present in an amount sufficient to provide foam stabilization.

10. An emulsifier system in accord with claim 8 in which the surfactant is present at a level of between about 1 percent and about 2 percent of the weight of the system.

11. An emulsifier system in accord with claim 8 in which the surfactant is nonionic and is selected from the group consisting of ethylene oxide adducts of higher fatty acids and ethylene oxide adducts of esters of higher fatty acids.

12. An emulsifier system in accord with claim 8 in which the surfactant is ionic and is a salt of a higher saturated fatty acid.

13. An emulsifier system in accord with claim 1 which is substantially free of di and triglycerides and propylene glycol diesters.

14. An emulsifier system in accord with claim 1 having less than about 10 percent of di and triglycerides and propylene glycol diesters.

15. An emulsifier system in accord with claim 1 which includes a solubilizer selected from the group consisting of sugars, skim milk solids, caseinates and gums.

* * * * *